April 17, 1962 W. MAIER 3,029,965
ELECTRICAL OUTLET BOX FOR ELECTRICAL CONDUCTORS
Filed June 15, 1960
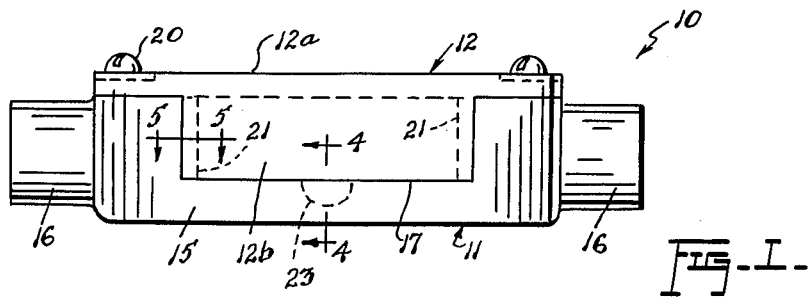
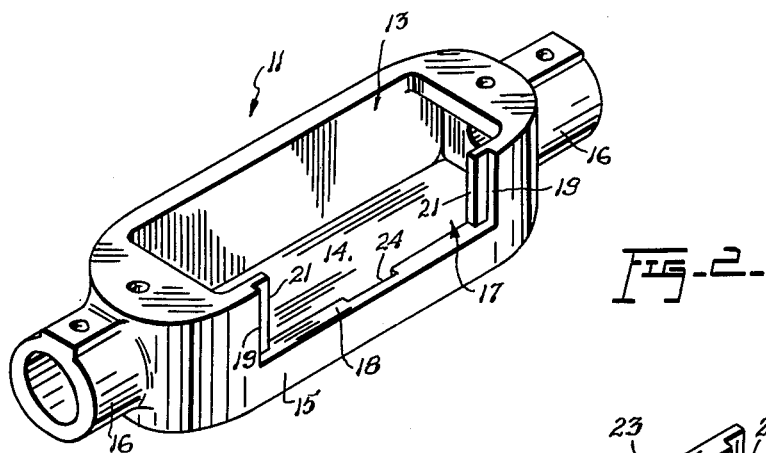
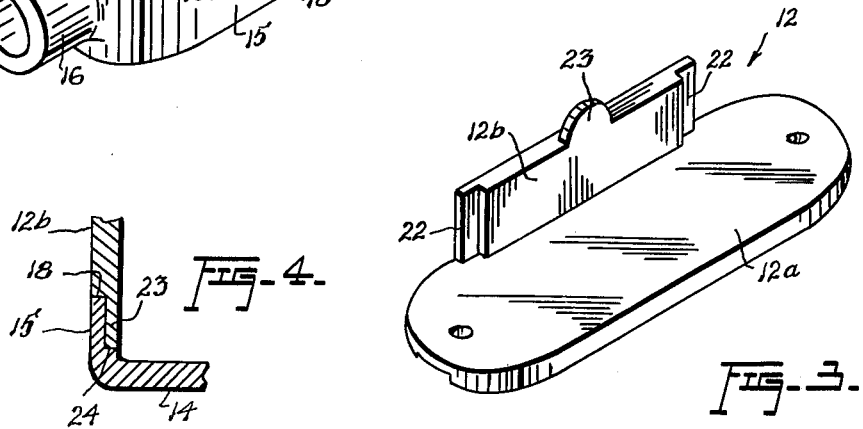
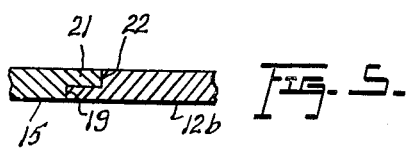
INVENTOR
William Maier
BY
ATTORNEY United States Patent Office 3,029,965
Patented Apr. 17, 1962

3,029,965
ELECTRICAL OUTLET BOX FOR ELECTRICAL CONDUCTORS
William Maier, 125 Lawlor Terrace, Stratford, Conn.
Filed June 15, 1960, Ser. No. 36,417
4 Claims. (Cl. 220—3.8)

This invention relates to new and useful improvements in electrical outlet boxes or junction boxes for electrical conductors.

Such boxes usually are provided at the sides thereof with one or more sockets wherein the conductors are secured, the individual wires of the conductors passing into the box where they are electrically connected together. The boxes usually have an open top provided with a removable cover, whereby access to their interior may be had for the purpose of electrically connecting or disconnecting the wires. In so doing, the wires are usually pulled out of the box through its open top and subsequently pushed back when the necessary electrical connections have been made, and during this procedure the wires are often scraped against the top edges of the box, with the result that insulation on the wires becomes damaged or that the wires become otherwise mutilated.

The principal object of the invention is to eliminate the disadvantage above outlined, this being attained by providing a side wall of the box with an access opening which communicates with the open top of the box and thereby substantially increases the facility whereby access to the interior of the box may be had, so that more space for manipulation of the wires is available and electrical connection or disconnection of the wires may be made without scraping and damaging the wires by contact with edges of the box.

An important feature of the invention resides in the provision of a closure for the aforementioned access opening in the side wall of the box, such a closure being formed integrally with the box cover so that it is removed and replaced simultaneously therewith.

The aforementioned access opening closure is in the form of a plate which is flush with the box side wall both at the inner and outer surfaces thereof, and another important feature of the invention resides in the provision of detent means for maintaining the closure in flush alignment with the side wall, so that no edges of the side wall or closure protrude to cut or otherwise damage the wires in the box.

Some of the advantages of the invention reside in its simplicity of construction, in its efficient operation, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of an electrical box in accordance with the invention;

FIGURE 2 is a perspective view of the box body with the cover and closure removed;

FIGURE 3 is an underside perspective view of the cover and closure;

FIGURE 4 is a sectional detail, taken substantially in the plane of the line 4—4 in FIGURE 1; and FIGURE 5 is a sectional detail, taken substantially in the plane of the line 5—5 in FIGURE 1.

Referring now to the accompaying drawings in detail, the outlet box or junction box for electrical conductors is designated in general by the reference character 10 and embodies in its construction a box body 11 and a combined cover and closure 12. The particular form of the box shown in the accompanying drawings is for illustrative purposes only, it being understood that the box may be of any suitable size and shape and adapted to serve either as an outlet box or a junction box, in accordance with conventional practice.

As shown, the box body 11 has an open top 13, a bottom 14 and a continuous side wall 15, and one or more sockets 16 are provided on the side wall, in which sockets conductors may be secured with individual wires thereof passing into the interior of the box.

The invention involves the provision of an elongated access opening 17 in the side wall 15 of the box body, this opening having a bottom edge 18 spaced above the bottom 14 of the body and a pair of end edges 19, while the top of the opening is open and in communication with the open top 13 of the box body, as is best shown in FIGURE 2.

The combined cover and closure 12 includes a cover portion 12a which is removably retained in position on the open top of the box body by suitable screws 20, and a closure portion 12b which, in the form of an elongated plate-like extension, is provided integrally at one side edge of the cover portion 12a in depending, perpendicular relation thereto, so that when the cover portion 12a is placed on the box body, the closure portion 12b is received in the opening 17 as shown in FIGURE 1.

The closure portion 12b is of the same thickness as the side wall 15 so that it fits flush in the opening 17 both at the inside and outside of the box, whereby no protruding edges of the box or of the closure present themselves to cut wires in the box. Detent means are provided for maintaining the closure portion 12b in flush alignment with the side wall 15, these detent means involving the provision of a pair of strip-like members 21 which are formed integrally with the side wall 15 at the end edges 19 of the opening 17. The members 21 are thinner than the side wall and contiguous with the inner surface of the side wall as shown, while the end edge portions of the extension plate or closure 12b are undercut at the inside thereof as shown at 22 to accommodate the members 21. In this manner, the members 21 prevent the closure 12b from shifting inwardly relative to the side wall 15. In addition, the detent means involve the provision of a downwardly projecting, substantially semicircular tongue 23 at the bottom edge of the closure 12b. The tongue 23 is thinner than the closure and contiguous with the inner surface of the latter, and the side wall 15 is provided at the inside of the bottom edge portion 18 of the opening 17 with a complemental recess 24 in which the tongue is received. Thus, the tongue 23 prevents the closure 12b from shifting outwardly relative to the side wall and, acting together, the members 21 and the tongue 23 serve to maintain the closure flush with the side wall of the box.

It is to be noted that the combined cover and closure 12 may be removed and replaced as a unit, so that the opening 17 is automatically available when the cover is removed from the box.

While in the forgoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a junction box for electrical conductors, the combination of an elongated box body having a pair of ends and a top wall provided with an elongated opening with its ends spaced longitudinally inwardly from the ends of the body, said body also having a side wall provided with an elongated opening communicating at the top thereof with the opening in the top wall, said side wall opening having end edges spaced longitudinally inwardly from the ends of the top wall opening and also having a lower edge spaced upwardly from the bottom of the box body, a unitary closure for the top wall and side wall openings of said body, said closure comprising an elongated top plate superposed on and coextensive with said top wall whereby end portions of the top plate overlie portions of the top wall between the ends of the top wall opening and the ends of the box body, said top wall and said top plate having flat abutting surfaces, a side plate provided at one longitudinal edge of said top plate and extending downwardly therefrom, said side plate being shorter than the top plate and having end edges spaced longitudinally inwardly from the ends of the top plate, said side plate being disposed in and coextensive with the side wall opening of the box body with inner and outer surfaces of the side plate in flush and coplanar relation to the respective inner and outer surfaces of said side wall, detent means for maintaining said side plate in coplanar relation with the side wall, and fastening elements extending through the end portions of said top plate into said portions of the top wall between the ends of the top wall opening and the ends of the box body, whereby to removably attach said unitary closure to the box body.

2. The device as defined in claim 1 wherein said detent means include a pair of strip-like members provided at said end edges of said opening in said side wall, strip-like members being thinner than the side wall and contiguous with the inner surface of the side wall, said side plate having its end edge portions provided at the inside thereof with undercuts receiving said strip-like members therein, whereby to prevent the side plate from shifting inwardly of the side wall into said box body.

3. The device as defined in claim 1 wherein said detent means include a downwardly projecting tongue provided on the bottom edge of said side plate, said tongue being thinner than the side plate and contiguous with the inner surface of the side plate, said wall being provided at the inside of the bottom edge portion of said opening with a recess receiving said tongue therein, whereby to prevent the side plate from shifting outwardly of the side wall.

4. The device as defined in claim 1 wherein said detent means comprise a pair of strip-like members provided at said end edges of said opening in said side wall, said strip-like members being thinner than the sidewall and contiguous with the inner surface of the side wall, said side plate having its end edge portions provided at the inside thereof with undercuts receiving said strip-like members therein, and a downwardly projecting tongue provided on the bottom edge of said side plate, said tongue being thinner than the side plate and contiguous with the inner surface of the side plate, said side wall being provided at the inside of the bottom edge portion of said opening with a recess receiving said tongue therein, whereby to prevent the side plate from shifting both inwardly and outwardly relative to said side wall.

References Cited in the file of this patent
UNITED STATES PATENTS

| | | |
|---|---|---|
| 883,549 | Lakin | Mar. 31, 1908 |
| 892,220 | Burns | June 30, 1908 |
| 898,188 | Burns | Sept. 8, 1908 |
| 1,950,552 | Hansen | Mar. 13, 1934 |
| 2,401,598 | Wood | June 4, 1946 |